July 22, 1947.       B. G. NELSON       2,424,413
REEL CONSTRUCTION
Original Filed Oct. 19, 1942
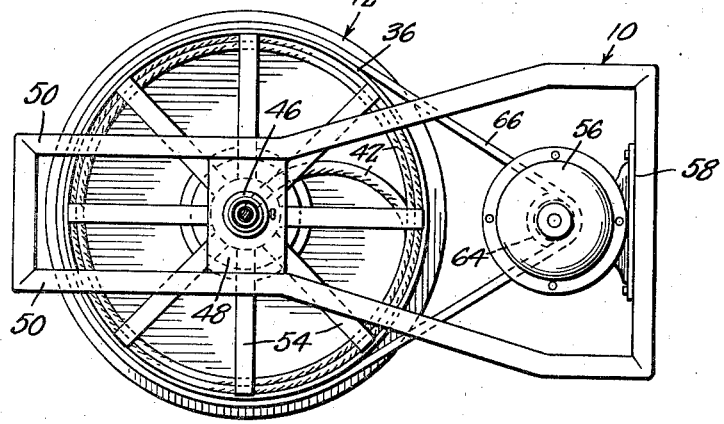
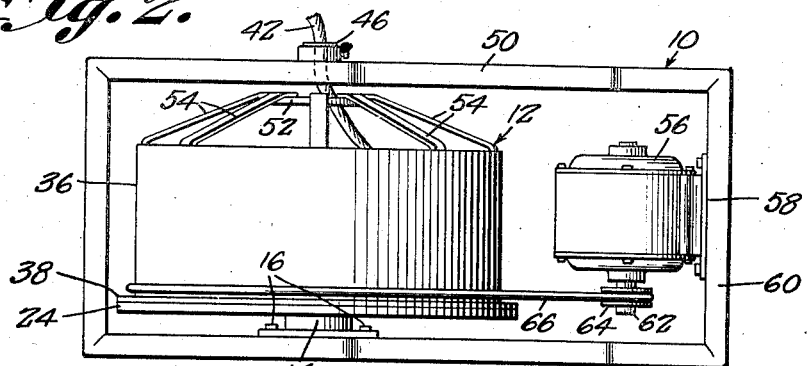
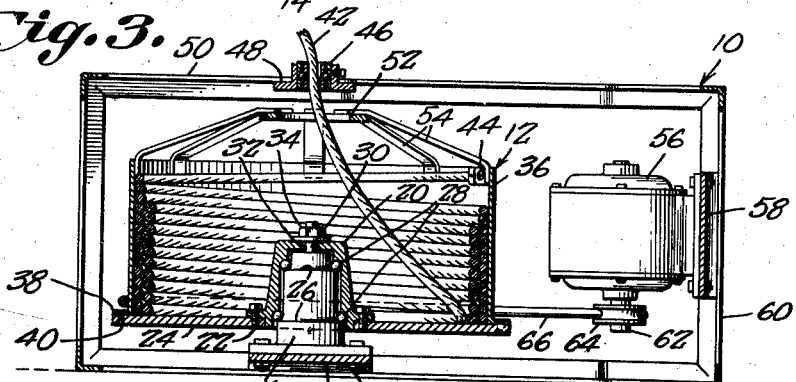
INVENTOR,
Bruce G. Nelson
BY
*Victor J. Evans & Co.*
ATTORNEYS Patented July 22, 1947

2,424,413

UNITED STATES PATENT OFFICE 2,424,413

REEL CONSTRUCTION

Bruce G. Nelson, Tacoma, Wash.

Original application October 19, 1942, Serial No. 462,569. Divided and this application February 3, 1944, Serial No. 520,937

2 Claims. (Cl. 15—104.30)

My invention relates to improvements in reel construction generally, and more particularly to a power driven type thereof for facilitating the winding of flexible sewer and drain cleaners, i. e., augers, and has among its objects and advantages the provision of a novel form of watertight reel to house the auger in a manner to trap water dripping therefrom as the same is wound upon the reel, in combination with a like form of supporting frame for the reel and a simplified and efficient drive for rotating the reel to impart rotary motion to the flexible rod.

This application is a division of my application for patent on Tube cleaner, Serial No. 462,569, filed October 19, 1942.

In the accompanying drawings:

Figure 1 is a top view.

Figure 2 is a side view.

Figure 3 is a sectional view.

Figure 4 is an end view of a cutting tool attached to one end of the flexible rod, and Figure 5 is a fragmentary side view of the cutting tool showing cutting teeth thereon.

In the embodiment of the invention selected for illustration, I make use of an elongated frame 10 having end portions of different widths, within which is mounted a rotary reel 12. This reel is supported on a post 14 bolted at 16 to a plate 18 secured crosswise of the bottom side of the frame 10, adjacent the inner end of the narrower portion thereof. A bearing shell 20 is bolted at 22 to a circular bottom 24 of the reel 10, to seat over the post 14. Races 26 are provided on the post 14 and the cap 20 for ball bearings 28. The shell 20 is coaxial with the bottom 24, and is held against accidental separation from the post 14 by means of a pin 30 projecting from the top of the latter, the pin being loosely passed through an opening 32 in the shell and provided with a nut 34.

An annular wall 36 is fixed to the bottom 24 by a flange 38 attached to the bottom by screws 40 and in a manner to have a watertight fit about the joint, so that the reel constitutes a receptacle for a flexible element or cable 42, which has one of its ends fixed at 44 to the wall 36 and is normally coiled inside the reel in the manner shown in Figure 3. This cable is loosely trained coaxially with an opening therein through an annular guide 46 mounted on a plate 48, the latter being secured crosswise of the top members 50 of the frame 10. Beneath and in line with the guide 46 is arranged a second annular guide 52 of a considerably greater diameter than the guide 46 and it is mounted centrally on a spider 54 secured on the top edge of the wall 36.

A motor 56 is bolted to a plate 58, secured crosswise of vertical members 60 at the wider end of the frame 10 and is positioned to dispose its shaft 62 vertically; a grooved drive pulley 64 being keyed on its lower end, with a belt 66 trained about the same and about the annular wall 36 of the reel, adjacent the flange 38.

In operation, rotation of the reel 12 imparts rotary motion to the flexible rod 42 as it is advanced in the sewer pipe or other duct being cleaned. In some cases it may be desirable to employ a cutter on the flexible element 42. Such a cutter is shown in Figures 4 and 5 and is comprised in a spirally shaped blade 68 having its inner end attached to the free end of the rod 42. This blade is preferably formed of flexible material and provided with cutting teeth 70 along its two edges.

The watertight construction of the reel 12 effectively traps any drippage of water or waste accumulations, from the flexible element 42 as it is withdrawn from the cleaned pipe and coiled within the reel.

A reel, such as that shown, is obviously simple in design, durable in construction, and efficient in operation to effect the desired rotary, i. e., twisting, motion to the flexible element during the unwinding thereof, as well as a uniform coiling of the same within the reel body while it is being wound.

Without further elaboration, the foregoing will so fully explain my invention, that others may, by applying current knowledge, readily adapt the same for use under various conditions of service.

I claim:

1. In a device of the class described, an elongated frame having end portions of different widths, a post rising from the bottom of said frame adjacent the inner end of the narrower portion thereof, a reel in the form of a hollow open topped body mounted for rotation on said post, said reel body having an impervious flat circular bottom wall and a cylindrical side wall, an annular guide mounted on the top side of said frame, a spider supported on the top edge of said side wall, a second annular guide supported centrally of said spider and coaxially with respect to the first named guide and said post, a flexible element having substantial length adapted to be coiled about the inner side of said side wall, one end of said element being secured to said side wall and its other end trained outwardly through said guides, an electric motor mounted within the wider portion of said frame with its rotor shaft vertically disposed, and a driving connection between said rotor shaft and said reel body, the narrower end of said frame extending beyond the latter.

2. The invention as defined in claim 1, with a flat plate secured crosswise of the bottom of said frame and supporting said post, a second flat plate secured crosswise of the top of said frame and supporting the first named guide in spaced relation with respect to said second guide, a bearing shell carried by the bottom wall of said reel body and seated over said post, and anti-friction bearings interposed between said shell and the post.

BRUCE G. NELSON.

REFERENCES CITED

The following references are of record in the file of this patent:

UNITED STATES PATENTS

| Number | Name | Date |
|---|---|---|
| 2,223,005 | Kerber | Nov. 26, 1940 |
| 2,292,713 | O'Leary | Aug. 11, 1942 |
| 2,284,939 | Asnard | June 2, 1942 |
| 1,815,532 | Vesey | July 21, 1931 |